United States Patent
Rappoport et al.

(10) Patent No.: US 6,465,597 B1
(45) Date of Patent: Oct. 15, 2002

(54) EPOXY-AMINE COMPOSITIONS CONTAINING SULFUR AS A CURE ACCELERATOR

(75) Inventors: Leonid Rappoport, Mountain View, CA (US); Alex Vainer, Fremont, CA (US); Aleksander Yam, Sunnyvale, CA (US)

(73) Assignee: Polymeright, Inc., Fremont, CA (US)

( * ) Notice: Subject to any disclaimer, the term of this patent is extended or adjusted under 35 U.S.C. 154(b) by 0 days.

(21) Appl. No.: 09/909,046

(22) Filed: Jul. 18, 2001

(51) Int. Cl.$^7$ .............................................. C08G 59/68
(52) U.S. Cl. ........................ 528/94; 523/457; 528/90; 528/93
(58) Field of Search ........................ 523/457; 528/90, 528/93, 94

(56) References Cited

U.S. PATENT DOCUMENTS 5,442,035 A    8/1995   Corley et al. .................. 528/90

FOREIGN PATENT DOCUMENTS

CZ    170699    *  9/1976

OTHER PUBLICATIONS

Vecera, M, *Polimery* 38(4–5), pp 175–179, 1993.*

* cited by examiner

*Primary Examiner*—Robert Dawson
*Assistant Examiner*—D. Aylward
(74) *Attorney, Agent, or Firm*—Lumen Intellectual Property Services, Inc.

(57) ABSTRACT

An epoxy-amine composition includes an epoxy resin, an amine curing agent and elemental sulfur as a cure accelerator. The degree of acceleration is highly regulated by the concentration of sulfur in the epoxy-amine composition and the time and conditions of the contact between sulfur and the amine curing agent of the epoxy-amine composition.

7 Claims, No Drawings

EPOXY-AMINE COMPOSITIONS CONTAINING SULFUR AS A CURE ACCELERATOR

FIELD OF THE INVENTION

This invention relates generally to epoxy-amine compositions. More particularly, it relates to epoxy-amine compositions containing sulfur as a cure accelerator.

BACKGROUND ART

The three-dimensional epoxy-amine network produced by the curing of amine-epoxy resin formulations is well known to exhibit desirable mechanical and thermal properties. As a result, amine-curable epoxy resin systems have been widely used as coatings, adhesives, sealants and matrices for fiber-reinforced composites. For each application, the epoxy-amine resin formulation must possess a particular degree of reactivity. In many cases, the reaction rate must be increased, and cure accelerators are added.

Various cationic and anionic catalysts, such as imidazoles, tertiary and some secondary amines, alkoxides, phenols, carboxylic acids, Lewis acids, metal halides and different salts and complexes are commonly added into the epoxy-amine systems as accelerators. Such accelerators, while improving the cure speed, have been found to sometimes either provide insufficient acceleration, or adversely affect the working life of the system as well as complicate the work with significant volumes of materials.

Other accelerators are being developed in order to overcome these difficulties. For example, calcium sulfonate or calcium hydrocarbyl sulfate, disclosed in U.S. Pat. No. 5,442,035, issued to Corley et al. on Aug. 15, 1995, are also used to accelerate the curing of epoxy-amine compositions.

However, there is always a need for new catalysts that could provide extra acceleration of curing process of epoxy-amine compositions in addition to the acceleration provided by the conventional catalysts without significant adverse effects.

SUMMARY

The present invention is directed to epoxy-amine compositions to which elemental sulfur is added as a cure accelerator.

According to a first embodiment of the present invention, epoxy-amine compositions of the present invention include an epoxy resin, an amine curing agent and sulfur. The epoxy resin means aromatic or aliphatic compounds with terminal epoxy groups, preferably glycidyl ethers. The amine curing agents can contain primary or secondary monoamines, primary or secondary diamines, primary or secondary polyamines, or combinations thereof. The concentration of elemental sulfur in the epoxy-amine composition is selected in dependence on a desired degree of cure acceleration.

A process for accelerating the curing of epoxy-amine composition is also described in a second embodiment of the present invention. In this process, sulfur is added to either or both of an amine curing agent and an epoxy resin of an epoxy-amine composition, and the epoxy-amine composition is then cured.

In such compositions the acceleration is more pronounced when sulfur is mixed with the amine curing agent prior to the mixing of the amine curing agent with the epoxy resin. Sulfur can dissolve in amines up to a certain concentration that is specific for each amine. The degree of acceleration depends on the time that sulfur is in contact with the amine curing agent and the temperature of the sulfur-amine mixture. It is demonstrated that sulfur acts as an accelerator for the epoxy-amine composition even when it is added to the amine curing agent in amounts exceeding its solubility limit. When sulfur is mixed in the epoxy resin prior to the mixing of the epoxy resin with the amine curing agent, the acceleration effect is still present, but it is less pronounced.

It is an advantage of the present invention to provide a low cost accelerator that gives a high degree of acceleration for the curing the epoxy-amine compositions and could be used alone or in combination with the conventional accelerators for curing the epoxy-amine compositions.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

An epoxy-amine composition of the present invention includes an epoxy resin, an amine curing agent, and elemental sulfur acting as a cure accelerator. The epoxy resins are aromatic or aliphatic compounds having terminal epoxy groups, preferably glycidyl ethers. The amine curing agent can contain primary or secondary monoamines, primary and secondary diamines, primary or secondary polyamines, or combination thereof.

Elemental sulfur can be mixed to either or both of the amine curing agent and the epoxy resin. The acceleration effect is more pronounced when elemental sulfur is mixed with the amine curing agent prior to the mixing of the amine curing agent with the epoxy resin. It is known that elemental sulfur can be dissolved in amines up to a certain concentration that is specific for each amine. However, elemental sulfur can act as an accelerator for an epoxy-amine reaction even when it is added in the amounts exceeding the solubility limit. The effect of acceleration of the reaction of amines and epoxies by the elemental sulfur is highly regulated by the time and conditions of the contact between elemental sulfur and the amine curing agent.

The degree of acceleration is a direct function of the concentration of the elemental sulfur in the epoxy-amine composition, even when sulfur is present in undissolved form. Therefore, the acceleration effect is still present when the elemental sulfur is mixed with the epoxy resin prior to the mixing of, the epoxy resin with the amine curing agent, but the acceleration is less pronounced than when the elemental sulfur is mixed with the amine curing agent prior the mixing of the amine curing agent with the epoxy resin.

As stated above, when sulfur is mixed with the amine curing agent, the acceleration effect up to a certain degree is strongly dependent on the time that sulfur is in contact with the amine curing agent and the temperature of the sulfur-amine mixture. For, example, it may take about two days to get a maximum acceleration effect at room temperature depending on the activity of amine curing agent, and the time is reduced if the sulfur-amine mixture is kept at elevated temperature.

It is observed that if sulfur is added to the epoxy resin prior to the mixing of the epoxy resin and the amine curing agent, the time of amine-sulfur interaction is lowest, and therefore, the effect of the acceleration for the same concentration of the elemental sulfur in the epoxy-amine mixture is lowest. If elemental sulfur is added to the amine curing agent immediately prior to the mixing of the amine curing agent and the epoxy resin, the acceleration effect is more pronounced. If the elemental sulfur is added to the amine curing agent, and the amine-sulfur mixture is kept for a certain time at an elevated temperature, the effect of acceleration is highest.

It must be noted that simultaneously with acceleration of curing of epoxy-amine compositions, sulfur modifies the cured polymer, increasing its adhesion to specific substrates.

The following example is provided to illustrate specific aspects of the invention. However, it is to be understood that the example is for illustrative purposes only, and in no manner is the present invention limited to the specific disclosures therein.

EXAMPLE 16 grams (32 mass parts) of D-230 diamine (available from Huntsman Corp.) were placed in each of seven 100 ml beakers. Elemental sulfur powder wasn't added to the beaker #1. 0.02 gram (0.04 mass part) of elemental sulfur powder was added to the beaker #2. 0.04 gram (0.08 mass part) of elemental sulfur was added to the beaker #3. 0.08 gram (0.16 mass part) of elemental sulfur was added in the beaker #4. 0.16 gram (0.32 mass part) of elemental sulfur was added to the beaker #5. 0.8 gram (1.6 mass parts) of elemental sulfur was added to the beaker #6, and 1.6 grams (3.2 mass parts) of elemental sulfur was added to the beaker #7. The amine-sulfur mixtures in the beakers were thoroughly mixed and placed in an oven at 40° C. for 15 minutes. It was observed that sulfur in the beakers #2, #3, #4 and #5 dissolved completely. Beakers #6 and #7 still contained undissolved sulfur.

50 grams (100 mass parts) of epoxy resin DEH 331 (available from Dow Chemical Co.) was added to each of seven beakers. The mixtures were mixed thoroughly and placed in an incubator at 40° C. A thermocouple was placed in each beaker and connected to a strip chart recorder. The curing time of the epoxy-amine composition was determined by the timing of the peak of exotherm. The curing time of the epoxy-amine compositions in seven beakers are shown in Table 1.

TABLE 1

| Beaker # | 1 | 2 | 3 | 4 | 5 | 6 | 7 |
|---|---|---|---|---|---|---|---|
| Epoxy resin, mass parts | 100 | 100 | 100 | 100 | 100 | 100 | 100 |
| Diamine curing agent, mass parts | 32 | 32 | 32 | 32 | 32 | 32 | 32 |
| Elemental sulfur powder, mass parts | 0 | 0.04 | 0.08 | 0.16 | 0.32 | 1.6 | 3.2 |
| Curing time, minutes | 122 | 112 | 108 | 105 | 105 | 88 | 77 |

The results in Table 1 demonstrate that elemental sulfur accelerates the curing of the epoxy-amine composition at an elevated temperature, and the degree of acceleration is a direct function of the sulfur concentration.

However, for some epoxy-amine compositions, the acceleration of curing provided by elemental sulfur is insufficient. In these cases, elemental sulfur is used simultaneously with other conventional accelerators, such as cationic and anionic catalysts including, but not limited to, imidazoles, tertiary and secondary amines, alkoxides, phenols, carboxylic acids, Lewis acids, metal halides and different salts and complexes, such as calcium sulfonate or calcium hydrocarbyl sulfate, to accelerate the curing beyond the capability of each accelerator.

It will be clear to one skilled in the art that the above embodiment may be altered in many ways without departing from the scope of the invention. Accordingly, the scope of the invention should be determined by the following claims and their legal equivalents.

What is claimed is:

1. An epoxy-amine composition comprising:

a) an epoxy resin;

b) an amine curing agent;

c) a first cure accelerator comprising elemental sulfur; and d) at least one second cure accelerator independently selected from the group consisting of cationic and anionic catalysts.

2. The epoxy-amine composition of claim 1, wherein said first cure accelerator and said at least one second cure accelerator are in contact with said amine curing agent prior to mixing with said epoxy resin.

3. The epoxy-amine composition of claim 1, wherein said first cure accelerator and said at least one second cure accelerator are in contact with said epoxy resin prior to mixing with said amine curing agent.

4. The epoxy-amine composition of claim 1, wherein said first cure accelerator is in contact with said epoxy resin prior to mixing with said amine curing agent; and wherein said at least one second cure accelerator is in contact with said amine curing agent prior to mixing with said epoxy resin.

5. The epoxy-amine composition of claim 1, wherein said first cure accelerator is in contact with said amine curing agent prior to mixing with said epoxy resin; and wherein said at least one second cure accelerator is in contact with said epoxy resin prior to mixing with said amine curing agent.

6. The epoxy-amine composition of claim 1, further comprising:

at least one other second cure accelerator, wherein said first cure accelerator and said at least one second cure accelerator are in contact with said amine curing agent prior to mixing with said epoxy resin; and wherein said at least one other second cure accelerator is in contact with said epoxy resin prior to mixing with said amine curing agent.

7. The epoxy-amine composition of claim 1, further comprising:

at least one other second cure accelerator, wherein said first cure accelerator and said at least one second cure accelerator are in contact with said epoxy resin prior to mixing with said amine curing agent; and wherein said at least one other second cure accelerator is in contact with said amine curing agent prior to mixing with said epoxy resin.

* * * * *